United States Patent [19]
Carter et al.

[11] Patent Number: 5,499,449
[45] Date of Patent: Mar. 19, 1996

[54] METHOD OF MANUFACTURING BATTERY TERMINALS

[75] Inventors: Warren Carter, Murfreesboro; Brad Carter, Rockvale, both of Tenn.

[73] Assignee: Molded Metal Services, Inc., Murfreesboro, Tenn.

[21] Appl. No.: 203,561

[22] Filed: Mar. 1, 1994

[51] Int. Cl.$^6$ .................................................. H01R 43/04
[52] U.S. Cl. ..................... 29/882; 429/121; 429/178; 411/107; 411/121; 29/876; 29/283.5; 29/520
[58] Field of Search ....................... 429/121, 178; 411/107, 121; 29/876, 283.5, 520, 882

[56] References Cited

U.S. PATENT DOCUMENTS

| | | | |
|---|---|---|---|
| 2,955,222 | 10/1960 | Beesch | 313/141 |
| 3,345,736 | 10/1967 | Jakeway | 29/509 |
| 3,793,086 | 2/1974 | Badger | 429/160 |
| 3,820,579 | 6/1974 | Barry | 29/432 |
| 4,422,236 | 12/1983 | Ware et al. | 29/876 |
| 4,662,205 | 5/1987 | Ratte et al. | 72/359 |
| 5,296,317 | 3/1994 | Ratte et al. | 429/178 |
| 5,349,840 | 9/1994 | Ratte et al. | 72/327 |

*Primary Examiner*—Thomas R. Neville
*Attorney, Agent, or Firm*—Rick R. Wascher; Laura K. Thomas; Wascher & Thomas

[57] ABSTRACT

A method of forming a battery terminal of the type having an electrically conductive screw encased within a conductive material casting such as lead. The preferred method uses a pair of die halves axially aligned with one another. A casting of a battery terminal having upper and lower terminal portions is provided, along with an electrically conductive post or screw. The casting and screw are placed between the die halves. The die halves are compressively forced against one another. A forging cone causes the casting to be forced into the thread spaces of the screw or against the surface of the post and changes the exterior angle of the casting.

20 Claims, 2 Drawing Sheets

METHOD OF MANUFACTURING BATTERY TERMINALS

BACKGROUND OF THE INVENTION

1. Field of the Invention

The invention relates generally to a method of installing an electronically conductive screw into a lead casting to form a battery terminal, but more specifically to methods of producing an assembled battery terminal with greater conductivity between the lead casting component and an electrically conductive post or screw component.

2. Description of the Related Art

Conventional battery terminals having lead casting components and electrically conductive post components are formed by pouring molten lead around the electrically conductive screw or post and allowing the lead to cool.

When an amount of lead is melted and becomes molten, its volume increases as it becomes less dense. Conversely, when lead cools its volume decreases as it becomes more dense. The decrease in lead volume from molten to solid can be described as lead shrinkage.

Accordingly, when molten lead is poured around an electrically conductive post and is allowed to cool, it shrinks and recedes from the adjacent surface of the post. As the volume of lead decreases during cooling, evacuated spaces between the lead casting and the conductive post or screw have been known to form. The evacuated spaces act as air pockets which are known to impair the electrical conductivity between the two components of the terminal.

In addition, a less than tight seal between the casting component and the electrically conductive post component has been known to allow minute quantities of electrolytes, liquids, corrosives and other substances associated with batteries, into the spaces between the post and the lead casting. The introduction of these substances between the components is known to cause corrosion of the post and further impair the conductivity of the combination.

It is also known that air bubbles become entrapped within a lead casting when molten lead cools. Trapped air bubbles have been known to make lead castings porous. In addition, conventional casting methods leave a rough exterior surface texture on the terminal.

A roughened terminal surface and trapped air bubbles can further reduce the amount of energy transferred from the available energy store, to which the battery terminal is attached, to the battery cable connected thereto.

Accordingly, a battery terminal of the type having an electrically conductive screw or post component encased within a ductile material casting manufactured in a manner to minimize air spaces between the screw and the ductile material has not been invented.

Further, a battery terminal of the type having an electrically conductive screw or post component encased within a ductile material casting manufactured in a manner to minimize air bubbles in the casting has not been invented.

Still further, a method of producing a battery terminal of the aforedescribed type, and having an enhanced conductivity between the screw or post and casting component in order to maximize the transfer of energy between the components, yet minimize the introduction of corrosives and other materials which would deleteriously affect the conductivity of the terminal, has not been invented.

SUMMARY OF THE INVENTION

The invention is directed to a method of forming a battery terminal having an electrically conductive post component and a metallic casting component surrounding at least a portion of the post. The steps include selecting and providing a die means configured for forming a battery terminal, selecting and aligning a battery terminal casting with the die means, selecting and applying a conductive post component to the battery terminal casting and forging the metallic casting component with the die means, thereby increasing the contact surface area of the metallic casting component with the conductive post component enabling greater conductivity therebetween.

The metallic casting component can be made from any suitable conductive material such as lead, copper, antimony, tin, aluminum, or any combination thereof. The electrically conductive post component can be made of any suitable conductive material, but is preferably formed of a metal harder than the casting component. In the preferred configuration, the casting component is substantially made of lead and the conductive post component is made of steel and is shaped like a screw having a thread form along its shank.

The die means may be comprised of cooperating upper and lower portions for sandwiching the metallic casting component therebetween. The die portions are preferably used to simultaneously shape the casting component and insert the conductive post component. Of course, they may first shape the casting component, before insertion of the conductive post, and be resized after the conductive post is applied to the casting component, so long as the material of the casting component is forced into contact with the surface of the conductive post. Ideally the contact between the casting component and post is maximized for efficient transmission of electrical energy.

The preferred shape of the forming dies resembles a truncated cone. The preferred outside angle of the truncated cone shaped casting component is approximately 1 degree and 30 minutes prior to forging, and preferably 3 degrees six minutes after forging.

It is therefore an object of the invention to produce a battery terminal having an electrically conductive post in combination with a substantially non-porous lead casting.

Another object of the invention is to produce a battery terminal having a threaded screw encased within a lead casting, and to provide a substantially uniform contact between the screw and casting enabling greater electrical conductivity therebetween.

It is a further object of the present invention to produce a battery terminal having an electrically conductive post component surrounded by a lead casting component such that the lead casting component has a substantially smooth exterior surface enabling greater electrical conductivity between the terminal and a battery cable connected thereto.

It is another object of the present invention to produce a battery terminal comprised of a threaded steel screw encased within a lead casting formed by a method other than pouring molten lead around the conductive screw component.

It is an advantage of the present invention to minimize air spaces between the screw and the ductile material components of a battery terminal.

It is a feature of the present invention to maximize the transfer of energy between the components of the terminal, yet minimize the introduction of corrosives and other materials which would deleteriously affect the conductivity of the terminal.

DESCRIPTION OF THE PREFERRED EMBODIMENTS

Figure 1:
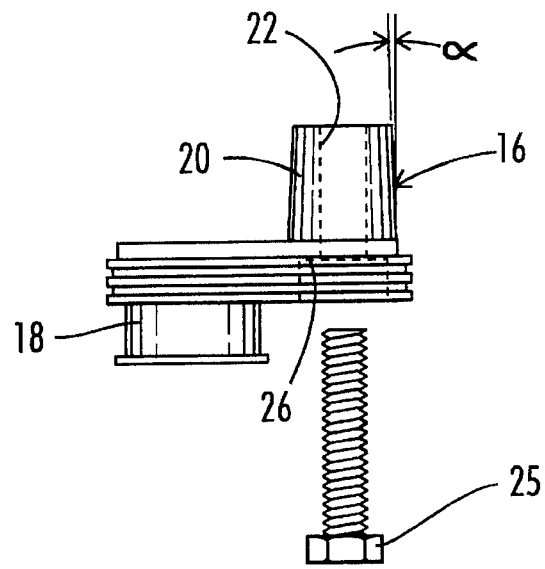
FIG. 1 is a partial cross-sectional view of a casting of a battery terminal having a longitudinal bore extending therethrough, and an electrically conductive screw inserted within the bore.
Figure 2:
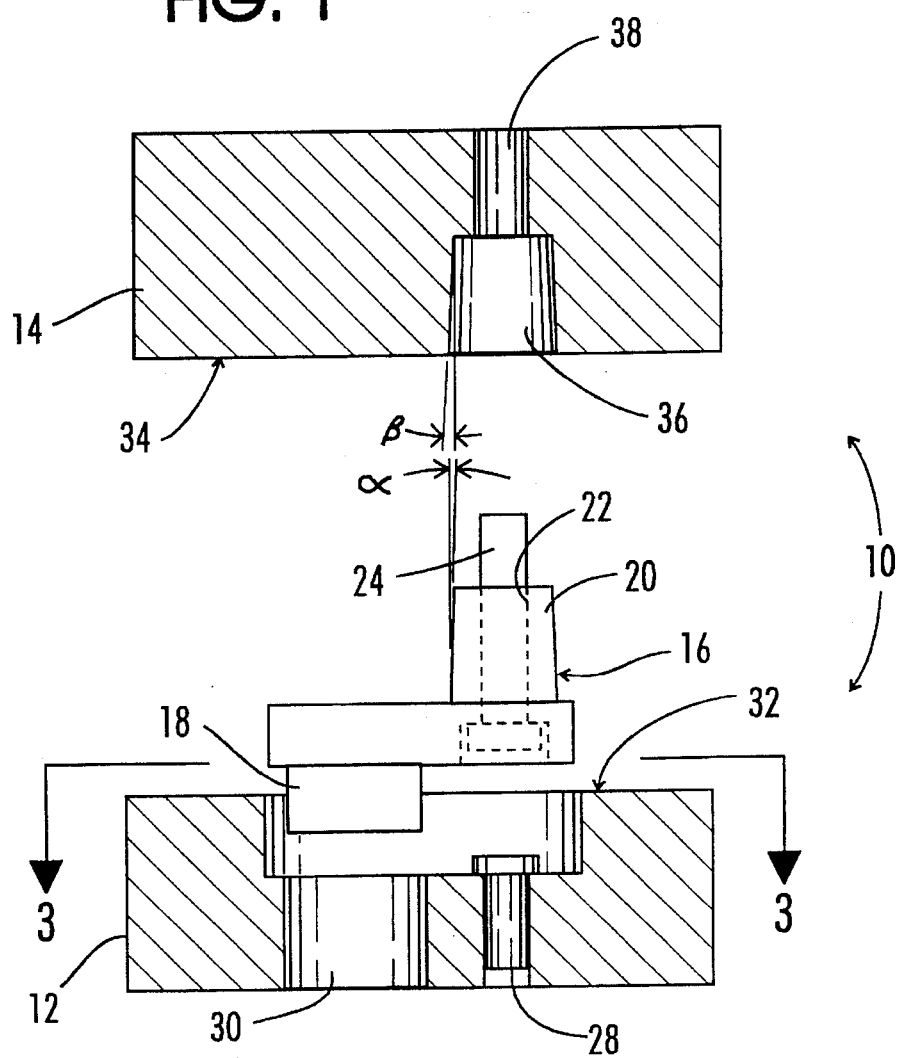
FIG. 2 is a cross-sectional schematic view of the forging components of the present invention shown in relative alignment with the combination of the electrically conductive screw and the casting of the battery terminal of FIG. 1.

Referring now to the drawings in more detail, FIGS. 1 and 2 illustrate the preferred components used to carry out the inventive method claimed herein. In FIG. 2, a forging apparatus or die means designated generally by the reference numeral 10 is used to compress a battery terminal casting to an electrically conductive screw.

The die means 10 is comprised of a lower die 12 and an upper die 14. Battery terminal casting 16 is preferably formed from pouring molten lead into a mold, allowing it to cool and removing the casting (not shown). Of course, the battery terminal can be molded from conductive materials other than lead, such as copper, antimony, tin, aluminum, or combinations thereof, but costs may be prohibitive, and ductility is a concern.

Figure 3:
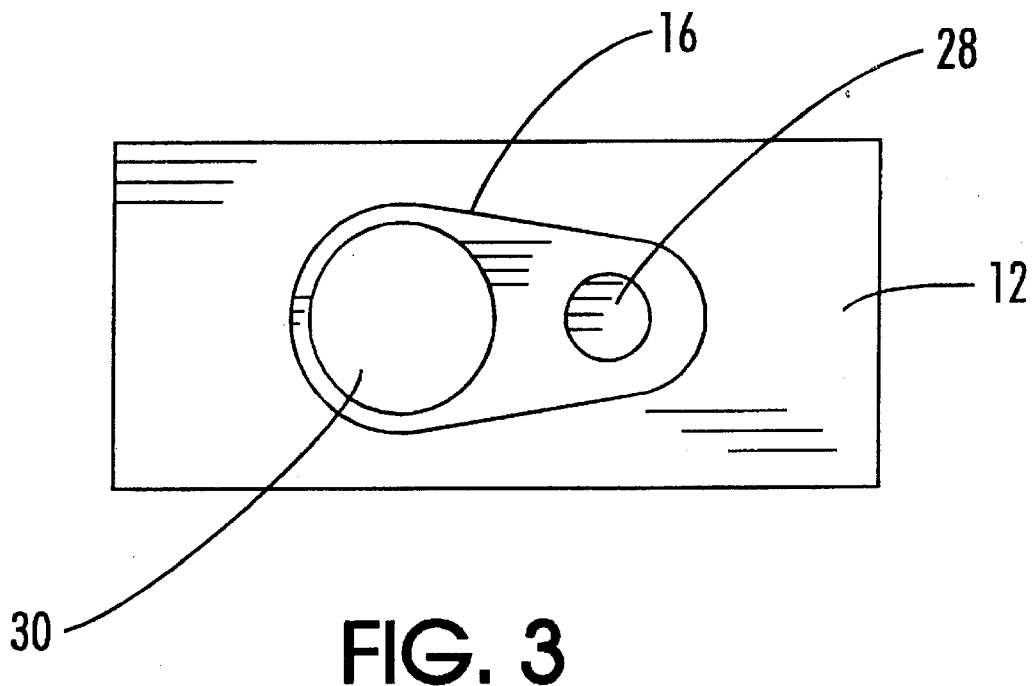
FIG. 3 is an external bottom view of the lower half of the forging die of FIG. 2 and illustrating the relative alignment of the battery terminal casting.

Battery terminal 16 has a lower terminal portion 18 and an upper terminal portion 20. Upper terminal portion 20 has an interior longitudinal bore 22 of varying diameter extending therethrough. An electronically conductive screw 24 having an outside thread diameter sized to occupy the bore 22 is forcibly inserted into the bore 22 when forging the terminal 16, or after the forging step, such that the terminal and screw are a forged combination and create a unit. The terminal 16 and screw 24 are aligned between the die halves as shown in FIGS. 2 and 3.

Lower terminal receiving bore 30 of the lower die 12 receives the lower terminal 18. The upper terminal 20 has an angled surface designated by the reference angle alpha and the interior forging cone 36 of the upper die 20 having an angle beta greater than alpha. Pedestal 28 protrudes upwardly into the lower die half such that it contacts the screw head 25 and holds it in place against the shoulder 26.

Lower die compression surface 32 is preferably planar and provided to contact upper die compression surface 34 during the forging process.

To practice the preferred inventive method, die surfaces 32 and 34 are axially aligned and pressed toward one another, or one towards the other. A lead casting of a battery terminal and an electrically conductive screw or post member, are interpositioned between the dies. The dies are then forced together.

During the forging process when the casting is reshaped and the casting material is forced into maximal contact with the conductive post, the protruding portion of the screw 24 is allowed to enter the shank channel 38 of the upper die half, and forging cone 36 having an interior surface angle beta. The upper die 34 shapes the upper terminal 20 having a surface angle alpha prior to forging.

Whether the screw 24 is forged into position simultaneously with the shaping of the terminal 16, or after the terminal is initially shaped and the terminal is resized with the dies to form the combination, screw head 25 abuts shoulder 26 within the bore 22. Shoulder 26 acts as a stop for the screw 24.

Figure 4:
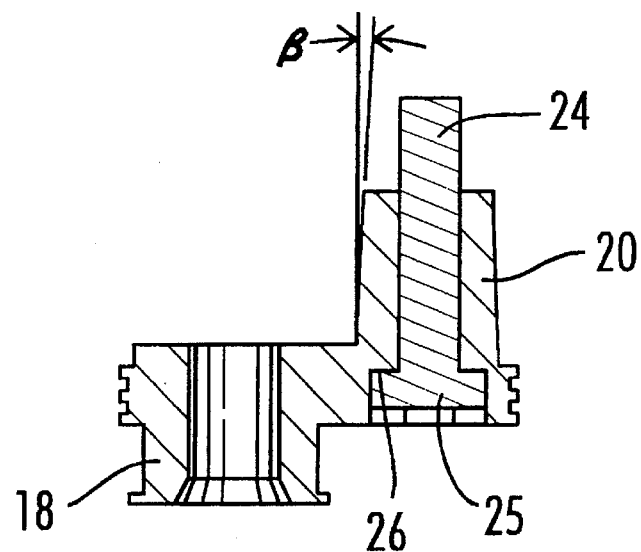
FIG. 4 is a partial cross-sectional view of the electrically conductive screw and casting components shown in FIG. 2 and after application of the inventive method.

After the application of the inventive process, the resultant battery terminal is like that shown in FIG. 4. The ductile material of the upper terminal 20 has been forced into the thread space of the screw shank 24.

The exterior surface of the upper terminal is now coned in accordance with the interior cone angle beta of the upper die half, and the density of the ductile material has now been increased as the particles of material are compressed against one another during the forging process.

What is claimed is:

1. A method of forming a battery terminal having an electrically conductive post component and a metallic casting component surrounding at least a portion of the post, comprising the steps of:

providing a die means for forming a battery terminal;

providing a battery terminal casting with a bore extending from a top of the casting to a bottom of the casting;

providing and aligning a conductive post component with the bore in the battery terminal casting;

aligning the casting and the conductive post with the die means; and inserting the conductive post component into the bore from the bottom of the battery terminal casting while forging the battery terminal casting component about the conductive post component with the die means.

2. The method of claim 1 wherein the step of providing a battery terminal casting further includes the step of:

selecting a casting made of a material selected from the group of metals consisting essentially of lead, copper, antimony, tin, and aluminum.

3. The method of claim 1 wherein the step of providing an electrically conductive post includes the step of:

selecting an electrically conductive post component having the characteristics of a conductive screw with a thread form.

4. The method of claim 1 wherein the step of providing a die means further includes the step of:

selecting a dies means having cooperating upper and lower portions for sandwiching the metallic casting component therebetween.

5. The method of claim 1 wherein the forging step further includes the step of:

shaping the metallic casting component enabling at least a portion thereof to resemble a truncated cone.

6. The method of claim 5 where the shaping step further includes the step of:

shaping the metallic casting to form a truncated cone having an exterior surface angle of approximately 3°–6'.

7. The method of claim 3 wherein the forging step further includes:

forcing the material of the metallic casting component into the thread form of the screw.

8. A method of forming a battery terminal from a battery terminal casting component and conductive post component, comprising the steps of:

selecting a die means, having spaced apart cooperating components, for forging a casting;

interpositionally aligning a casting having a top, a bottom and a bore, and an electrically conductive post between the spaced apart cooperating components of the die means;

positioning the electrically conductive post component in the bore from the bottom of the casting enabling it to extend beyond the top of the casting; and forging the casting with the die means enabling the casting component to be compressed about the conductive post component.

9. The method of claim 8 wherein the forging step further includes the step of:

moving one of the cooperating components of the die means toward the other cooperating component.

10. The method of claim 8 further including the step of:

selecting a casting component composed of a material selected from the group consisting essentially of lead, copper, antimony, tin, and aluminum.

11. The method of claim 8 further including the step of:

selecting an electrically conductive post component exhibiting the characteristics of a screw having a thread form.

12. The method of claim 11 wherein the forging step further includes:

shaping the casting component enabling at least a portion thereof to resemble a truncated cone while forcing the material of the casting component into the thread form of the screw.

13. The method of claim 1 wherein the forging step includes:

forming the surface of the truncated cone has an exterior surface angle of approximately 3°–6'.

14. A method of forming a battery terminal, comprising the steps of:

providing an electrically conductive screw and battery terminal casting having a top and a bottom;

forming a through bore in the battery terminal casting;

aligning the conductive screw with the bore of the battery terminal casting;

providing a forging die and orienting the forging die about the casting and screw combination; and introducing the screw into the bore of the casting and forging the casting about the conductive screw.

15. The method of claim 14 wherein the providing and orienting step further includes the step of:

aligning a first die component with a second die component.

16. The method of claim 14 wherein the forging step further includes:

shaping the casting enabling at least a portion thereof to resemble a truncated cone having an exterior surface angle.

17. The method of claim 1 wherein the forging step further includes:

forcing the conductive screw into the casting before the casting is forged.

18. The method of claim 14 wherein the step of providing a casting further includes the step of:

selecting a casting formed from a material selected from the group consisting essentially of lead, copper, antimony, tin, and aluminum.

19. The method of claim 1 wherein the step of inserting the conductive post component into the bore of the battery terminal casting further includes the step of positioning the conductive post component within the bore of the battery terminal casting at a recess at the bottom of the battery terminal casting.

20. The method of claim 14 wherein the step of aligning the conductive screw with the bore of the battery terminal casting further includes the step of positioning the conductive post component within the bore of the battery terminal casting at a recess at the bottom of the battery terminal casting.

* * * * *